United States Patent [19]
Korzan

[11] Patent Number: 5,477,750
[45] Date of Patent: Dec. 26, 1995

[54] VARIABLE LENGTH SHAFT ASSEMBLY

[75] Inventor: William E. Korzan, Bethlehem, Conn.

[73] Assignee: The Torrington Company, Torrington, Conn.

[21] Appl. No.: 56,271

[22] Filed: May 3, 1993

[51] Int. Cl.[6] ........................................ G05G 1/08
[52] U.S. Cl. .................. 74/579 R; 74/493; 403/372; 280/777
[58] Field of Search ............................ 74/491, 492, 493, 74/586, 581, 579 R; 403/365, 366, 367, 372; 464/172, 183; 180/146; 280/777, 775, 774

[56] References Cited

U.S. PATENT DOCUMENTS

| | | | |
|---|---|---|---|
| 3,318,170 | 5/1967 | Runkle | 74/493 |
| 3,444,753 | 5/1969 | Runkle | 74/493 |
| 3,665,777 | 5/1972 | Jensen | 74/492 |
| 4,269,043 | 5/1981 | Kizu et al. | 64/11 R |
| 4,622,022 | 11/1986 | Diffenderfer et al. | 464/183 |
| 5,115,691 | 5/1992 | Beauch | 74/493 |
| 5,152,627 | 10/1992 | Arnold | 403/109 |
| 5,235,734 | 8/1993 | DuRocher | 280/777 |

Primary Examiner—Charles A. Marmor
Assistant Examiner—David Fenstermacher
Attorney, Agent, or Firm—Michael H. Minns

[57] ABSTRACT

A steering shaft coupling comprising: an outer tubular shaft member, a coaxial inner shaft member slidably inserted within the outer tubular shaft member, and a plurality of wedges located between the outer tubular shaft member and the inner shaft member. The plurality of wedges being locking wedges wherein the wedges tend to be retained in the spaces between the shaft members upon application of torque from one shaft member to the other shaft member through the wedges.

6 Claims, 3 Drawing Sheets

VARIABLE LENGTH SHAFT ASSEMBLY

BACKGROUND OF THE INVENTION

This invention relates generally to shaft assemblies which are variable in length and more particularly to a shaft assembly which is adaptable for use as the steering shaft in steering devices of motor vehicles.

In certain applications, during the assembly of a vehicle, the shaft assembly, which is attached to the steering column at one end and the steering gear at the other end, must be extended axially in order to be installed to its nominal working position. In addition, the shaft assembly is often surrounded by other engine compartment components such as the exhaust manifold, catalytic convertor, or brake booster and during assembly is often hidden and hard to reach. Therefore, a low force to slide is essential for ease of installation. An additional requirement for the shaft assembly is the ability to accommodate any body/chassis flex due to road conditions.

Generally, in order to decrease the force to slide the shaft assembly axially, the clearance between the male and female members must increase. Consequently, the rotational lash or play of the shaft assembly will increase. Attempts to make steering as responsive as possible have forced the rotational lash requirements to be reduced.

The foregoing illustrates limitations known to exist in present variable length shaft assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering shaft coupling comprising: an outer tubular shaft member, a coaxial inner shaft member slidably inserted within the outer tubular shaft member, a plurality of wedge shaped members between the inner shaft member and the outer tubular shaft member, torque being transmitted between the inner shaft member and the outer tubular shaft member through at least one wedge shaped member, and a locking means for retaining a wedge shaped member in a fixed position between the inner shaft member and the outer tubular shaft member whenever torque is transmitted from one shaft member to the other shaft member through a wedge shaped member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
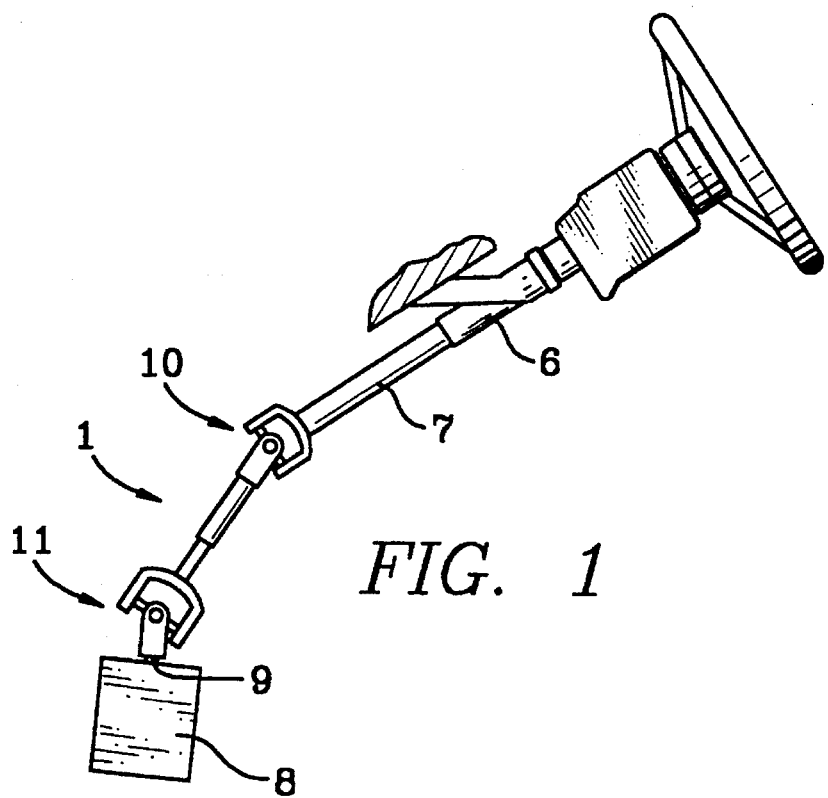
FIG. 1 is a diagrammatical illustration of the steering system of an automobile in which a coupling of the present invention is applied.

FIG. 1 shows an steering shaft coupling 1 of the present invention applied to the steering system of an automobile. The steering shaft coupling 1 is interposed between a steering main shaft 7 extending from a steering column 6 and a steering gear shaft 9 attached to a steering gear case 8. Typically, the steering shaft coupling 1 is connected to the steering main shaft 7 and the steering gear shaft 9 by a pair of universal joints 10, 11.

Figure 2:
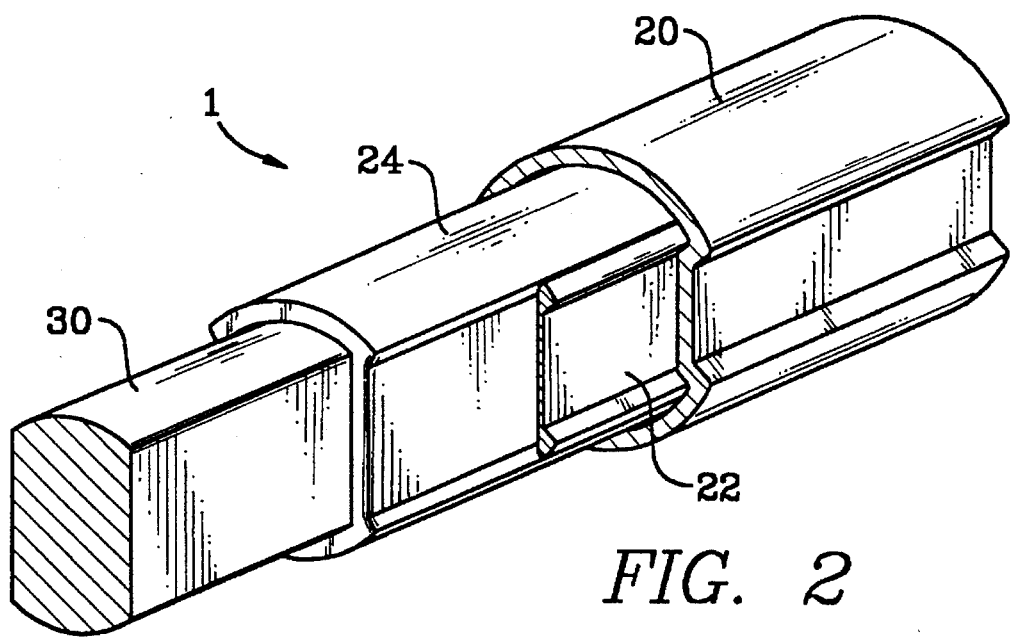
FIG. 2 is a perspective view of a coupling embodying the present invention.
Figure 3:
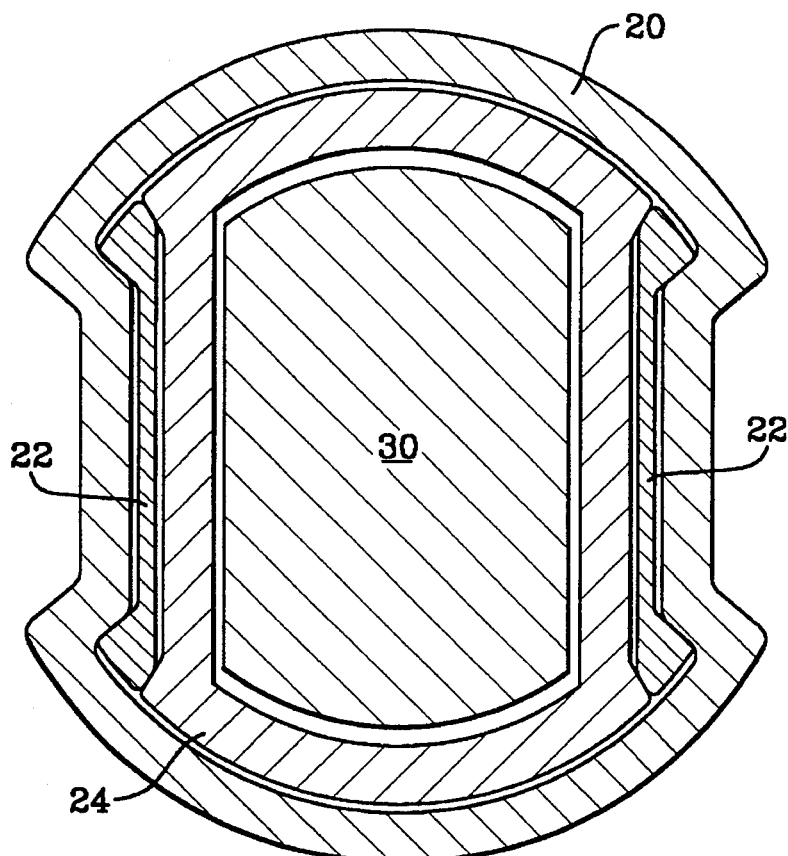
FIG. 3 is a cross-sectional view of the coupling of FIG. 2.
Figure 4:
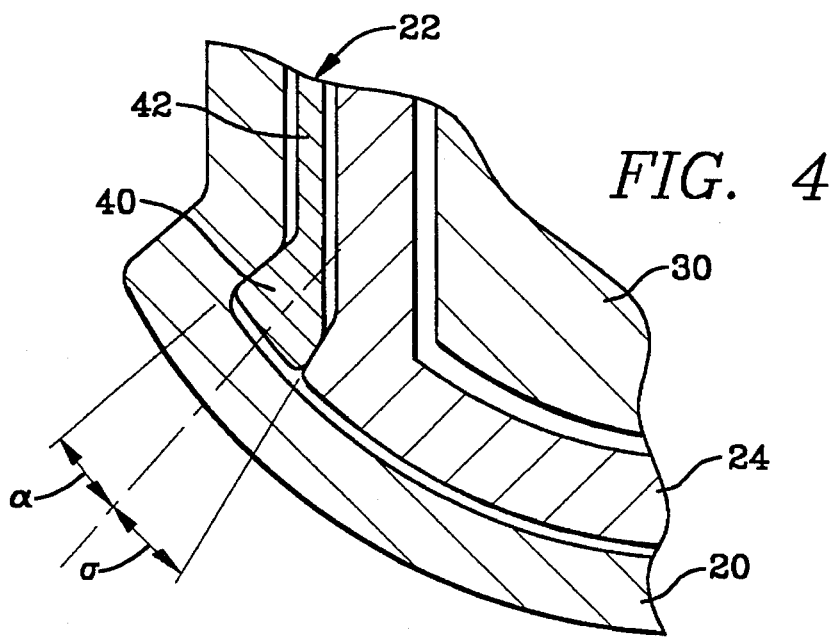
FIG. 4 is an enlarged cross-sectional view of a portion of the coupling shown in FIG. 3.

FIG. 2 shows a perspective view of the coupling 1 of the present invention. Portions of the coupling 1 have been removed to show the details of the coupling 1. The coupling 1 is comprised of three main components, an outer tubular shaft member 20, an inner shaft member 24 and a plurality of wedge members 22 located between the outer shaft member 20 and the inner shaft member 24. A lower shaft 30 is connected to the inner shaft member 24. The outer shaft member 20 may be axially extended such that universal joint 10 is attached directly to the outer shaft member 20. An upper shaft member (not shown) may be used to connect the outer shaft member 20 to the universal joint 10. The lower shaft 30 is preferably slidable within the inner shaft member 24.

Each wedge member 22 consists of a pair of wedges 40 connected by a wedge spring 42. The wedges 40 have an approximate triangular shape. The sides of the wedges 40 which contact the outer tubular shaft member 20 and the inner shaft member 24 are not parallel. The portions of the outer tubular shaft member 20 and the inner shaft member 24 which contact the wedges 40 are also not parallel and define a space, this space having an approximate triangular shape.

The characteristics which allow this coupling 1 to work are wedge angle, wedge spring load and coefficient of friction between the wedges 40 and the shaft members 20, 24. Proper selection of the wedge shape (i.e. angle) and the coefficient of friction between the wedge 40 and the outer tubular shaft member 20 and the inner shaft member 24 results in a "locking wedge," a wedge which tends to lock in place between the two shaft members 20, 24. With a locking wedge, the wedges 40 will tend to stay fixed in between the two shafts 20, 24 as torque increases, rather than be squeezed out, like a watermelon seed.

Figure 6:
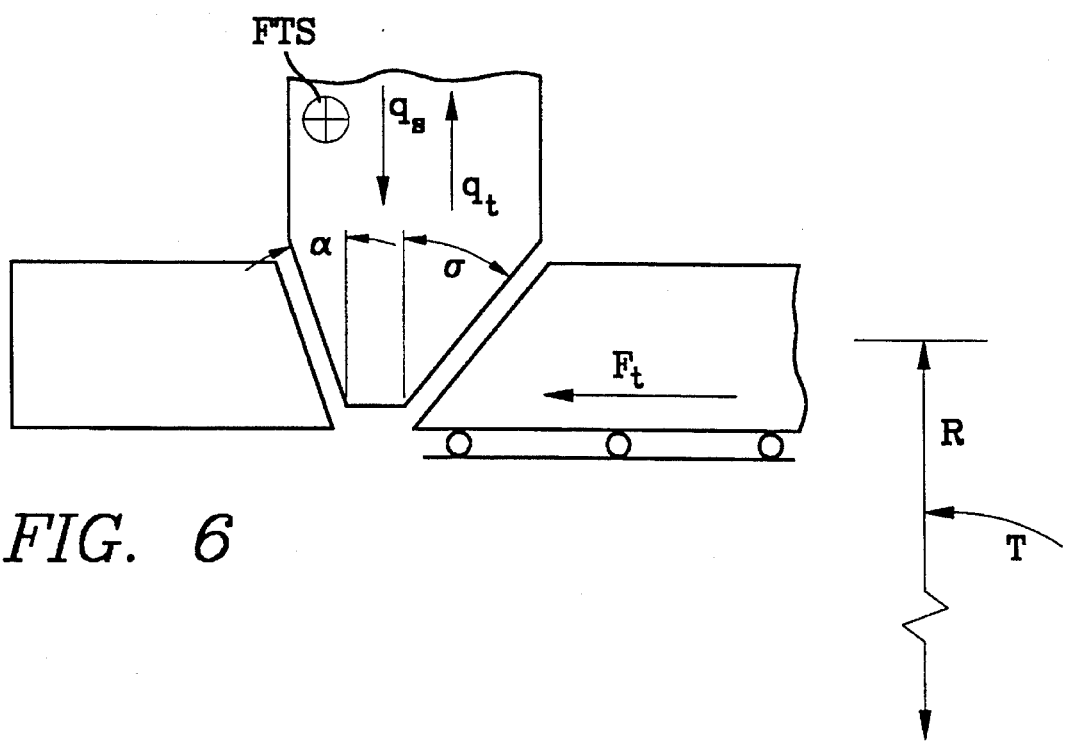
FIG. 6 is a schematic illustration of a locking wedge.

FIG. 6 illustrates the determination of the proper wedge angle. The desired locking effect is achieved when the force ($q_t$) tending to eject the wedge 40 from between the two shaft members 20, 24 is zero or less than zero. The ejection force, $q_t$ can be determined from the following equation:

$$q_t = F_T(\tan \sigma + \tan \alpha - 2\mu)$$

wherein:

μ—coefficient of friction

σ—Angle between wedge and first shaft member, in FIG. 6, the first shaft member is the member applying torque to the wedge α—Angle between wedge and second shaft member $F_t$—Torque applied to the wedge T—Rotational torque applied to the coupling R—Radius of the coupling shafts FTS—Force to slip one shaft member relative to the other (FTS is perpendicular to the plane of the paper)

$q_s$—Spring force biasing wedge into the coupling $q_r$—Wedge ejection force.

Since the torque applied to the wedge, $F_t$, is positive, the sum of (tan σ+tan α−2μ) must be zero or less than zero. Therefore, the locking wedge effect is independent of the applied torque.

To assure ease of installation, a low force to slide is desired for the coupling 1. The force to slide (FTS) between the two shaft members can be determined by the following:

$$FTS = 4\mu q_s \left( \frac{1}{\tan\sigma\cos\alpha + \sin\alpha} \right) + \left( \frac{1}{\sin\sigma + \cos\sigma\tan\alpha} \right)$$

For the embodiments shown in the Figures, the spring force, $q_s$, is a tension force caused by the connecting wedge spring 42. The spring force may also be a compression force pushing the wedges 40 into the space between the shaft members 20, 24.

Figure 5:
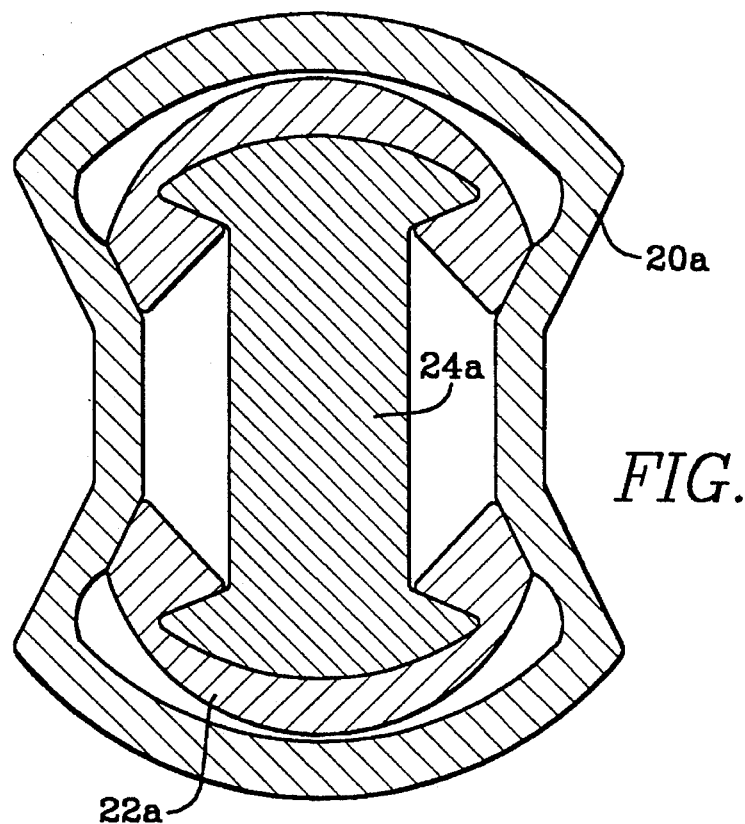
FIG. 5 is a cross-sectional view similar to FIG. 3 showing an alternate embodiment of the coupling of the present invention.

In the preferred embodiment of coupling 1, the outer tubular shaft member 20, and the inner shaft member 24 each have shape similar to a double −V. Four wedges 40 are connected in pairs by a wedge spring or biasing member 42. An alternate embodiment of coupling 1 showing a different shape for shaft members 20a, 24a and wedge members 22a is shown in FIG. 5.

The preferred embodiment of coupling 1 is designed to use locking wedges to transmit torque through two of the wedges 40, these wedges being diagonal opposite one another, while the other two diagonal opposite wedges 40 are pulled into any clearance in the coupling 1 by the wedge spring 42 therefore compensating for any manufacturing tolerances and any wear on the wedge surfaces. The proper selection of the wedge angle and the spring force, $q_s$, can result in a coupling 1 which has no rotational clearance. This occurs because the unloaded wedges 40 are pulled into any clearance in the coupling 1 by the wedge spring 42 such that when the direction of the rotational torque changes, the now loaded wedges (previously unloaded) are already tight in the coupling 1.

Having described the invention, what is claimed is:

1. A steering shaft coupling comprising:

an outer tubular shaft member;

a coaxial inner shaft member slidably inserted within the outer tubular shaft member;

a plurality of wedge shaped members between the inner shaft member and the outer tubular shaft member;

torque being transmitted between the inner shaft member and the outer tubular shaft member through at least one wedge shaped member;

a locking means for retaining a wedge shaped member in a fixed position between the inner shaft member and the outer tubular shaft member whenever torque is transmitted from one shaft member to the other shaft member through said wedge shaped member; and a biasing means for biasing a pair of wedge shaped members together, the biasing means connecting the wedge shaped members together in pairs.

2. The steering shaft coupling according to claim 1 wherein the inner shaft member is tubular; and a coaxial solid shaft member is slidably inserted within the tubular inner shaft member, the shapes of the inner tubular shaft member and the solid shaft member permitting the transmission of torque between the solid shaft member and the inner shaft member.

3. The steering shaft coupling according to claim 1 wherein each wedge shaped member is located in a space between the outer tubular shaft member and the inner shaft member, there being a plurality of said spaces, the angle between a wedge shaped member and the outer tubular shaft member defining an angle σ, the angle between a wedge shaped member and the inner shaft member defining an angle α, there being a coefficient of friction μ between a wedge shaped member and the inner shaft member and the outer tubular shaft member, the locking means being defined by the tan σ+tan α−2μ being less than or equal to zero.

4. The steering shaft coupling according to claim 1 wherein each wedge shaped member is located in a space between the outer tubular shaft member and the inner shaft member, there being a plurality of said spaces and having a means for biasing each wedge shaped member into said space.

5. An axially extensible torque transmitting steering shaft coupling comprising:

an outer tubular first member;

a coaxial inner second member, the first member and the second member constructed to transmit torque from one member to the other member; and a plurality of axially extending wedge shaped members interposed between the first member and the second member, the wedge shaped members being arranged in a plurality of pairs, each pair being connected by a means for biasing the connected wedge shaped members towards one another, the transmitted torque being transmitted through a plurality of wedge members.

6. The axially extensible torque transmitting steering shaft coupling according to claim 5, further comprising:

a locking means for retaining a wedge shaped member in a fixed position between the inner shaft member and the outer tubular shaft member whenever torque is transmitted from one shaft member to the other shaft member through a wedge shaped member.

\* \* \* \* \*